United States Patent [19]

Jacobsen

[11] Patent Number: 4,640,655

[45] Date of Patent: Feb. 3, 1987

[54] CONTINUOUS FEEDING APPARATUS

[75] Inventor: Marvin A. Jacobsen, Winston, Oreg.

[73] Assignee: Con-Vey/Keystone, Inc., Roseburg, Oreg.

[21] Appl. No.: 722,338

[22] Filed: Apr. 12, 1985

[51] Int. Cl.[4] .................... B65G 59/02; B65G 59/08
[52] U.S. Cl. ................................. 414/119; 271/158; 414/118; 414/124
[58] Field of Search ................. 414/98, 117, 118, 119, 414/124; 271/157, 158, 159; 187/1 A

[56] References Cited

U.S. PATENT DOCUMENTS

| | | | |
|---|---|---|---|
| 1,272,472 | 7/1918 | Lohman | 414/117 |
| 2,690,337 | 9/1954 | Halahan et al. | 271/159 |
| 2,958,527 | 11/1960 | Seel | 271/158 |
| 2,993,609 | 7/1961 | Enterline et al. | 414/118 X |
| 3,101,851 | 8/1963 | Heide et al. | 414/98 X |
| 3,288,463 | 11/1966 | Stuart | 271/158 |
| 3,565,266 | 2/1971 | Buss | 414/118 |
| 3,765,648 | 10/1973 | Rasmussen et al. | 254/47 |
| 4,405,276 | 9/1983 | Wiegand | 414/119 |

FOREIGN PATENT DOCUMENTS

| | | | |
|---|---|---|---|
| 128230 | 5/1950 | Sweden | 414/118 |
| 168852 | 10/1959 | Sweden | 414/118 |

Primary Examiner—Leslie J. Paperner

Attorney, Agent, or Firm—Klarquist, Sparkman, Campbell, Leigh & Whinston

[57] ABSTRACT

Apparatus for continuously feeding objects from the top of tiered loads includes in a preferred embodiment a hoist pivotable at its base to receive a first tiered load and then hoist the load upwardly along an angular load path. Extendable skids are mounted along the angular path for relative movement toward the load as it is hoisted, the skids being adapted continuously to engage the load and feed tiers from its ends. Supporting accumulator forks disposed along the path are insertable therein to receive the load from the hoist so as to maintain the load's engagement with the skids as the hoist retracts and pivots to receive a second load. Once all the tiers have been removed from the forks, they retract from the load path and the second load is hoisted to engage the skids. In a second embodiment, the hoist receives the first load and hoists it vertically. A raking mechanism rests on the load and engages it to rake successive tiers from the load. A supporting accumulator fork is disposed along the path and insertable therein to receive the first load from the hoist as it is hoisted to maintain the load's engagement with the raking mechanism as the hoist retracts to receive a second load. Once all the tiers have been raked from the first load, the forks retract to allow engagement of the raking mechanism with the second load now hoisted in position by the hoist.

12 Claims, 6 Drawing Figures

CONTINUOUS FEEDING APPARATUS

BACKGROUND OF THE INVENTION

This invention generally relates to a feeding apparatus, and more particularly, is concerned with apparatus for receiving and continuously feeding objects from successive tiered loads to a conveyor or the like.

There are numerous industrial applications wherein it is desired to feed objects off a stacked load onto a conveyor for further handling. For example, in the lumber industry rough sawn boards or cants are stacked while they air dry or are passed through a kiln and subsequently are pressed through planers or sanders for further processing. Feeders have been developed to feed boards or the like from such stacked loads onto a conveyor. A stud feeder, for example, as heretofore constructed commonly includes on one end a hoist with a lift bed and support columns for receiving a tiered load of studs from a truck. The hoist is pivotable at its base to tilt the columns toward and over a conveyor belt which leads from the feeder to a planer or sander. With the hoist tilted, the lift bed is hoisted upward along the columns of the hoist to raise the load along an angular load path toward the tops of the hoist columns. Each tier of studs slides from the lift bed as it clears the column tops onto the conveyor and is carried to the planer or sander. The bed retracts when the last tier of the load slides from it, and the hoist pivots back to a vertical position, ready to receive a successive load. With the successive load in place, the hoist again pivots and the load is hoisted upward along the load path. No studs are fed from the apparatus during the time between feeding the last tier from the preceding load and feeding the top tier from the succeeding load, a delay of about 30 seconds.

Until recent improvements in planers and sanders increased their capability, this delay between loads was insignificant compared to the time it took the planer or sander to shape the studs in an entire load. However, the high-speed planers and sanders introduced in the last several years work much faster, typically shaping an entire load of studs in about 2½ minutes. Conventional stud feeders cannot take advantage of this capability. Thirty seconds of delay, before insignificant, now causes the planer to be idle about one-sixth of its operating time, representing a significant production loss.

One attempt to solve the problem has been to use two stud feeders and conveyors working in tandem. The two conveyors are positioned to converge at the planer. One apparatus feeds studs to its conveyor while the other receives and hoists a succeeding load so that studs are continuously fed from one conveyor or the other to the planer. But this approach is impractical for most lumber mills because of the cost. The additional area required is often not readily available in the mill and, in many cases, can be obtained only by enlarging an existing facility. Added to that is the expense of second apparatus and conveyor, which by itself doubles the cost for providing continuous feeding of studs.

SUMMARY OF THE INVENTION

It is an object of the present invention to provide an apparatus for continuously feeding objects from tiered loads.

It is a further object of the present invention to provide a tiered load-feeding apparatus from which objects are continuously fed automatically.

More particularly, it is an object of the present invention to provide an apparatus for continuously feeding lumber from tiered loads of the same.

It is still another object of the present invention to provide a continuous feeding apparatus in which a preceding load is fed by the apparatus as a successive load is received by the apparatus.

The illustrated embodiments of the invention comprise a stud-feeding apparatus including a hoist which receives a first tiered load of studs and then hoists the load upward along a load path. Tier-discharging means mounted for relative movement along the load path engages the first load to effect discharge of successive tiers from it. As the load continues to be hoisted, load-accepting means disposed along the path are inserted into the path to receive the load from the hoist means. The accepting means maintains engagement of the load with the tier-discharging means as the hoist means retracts to receive a second load. Once all the tiers have been fed from the load-accepting means, it retracts from the load path to allow engagement of the tier-discharging means with a successive load now being hoisted by the hoist. With this operation cycle, the tier-discharging means continuously engages and feeds successive tiers from successive loads without delay.

In each of the embodiments shown, the tier-discharging means is adapted to move along the path as a load is hoisted at a slower rate than the hoisting of the load so that the discharging means engages the load to effect discharge of the tiers therefrom. The discharging means is also adapted to retract along the path once the load is received and held by the load-accepting means to continue feeding tiers from a stationary load. In one embodiment, the tier-discharging means includes skids that are moved along the load path in such manner as to permit successive tiers to slide from the ends of the skids. In the second embodiment, the tier-discharging means includes an endless lugged raking chain arranged continuously to engage the load to rake successive tiers from its top.

The load-accepting means which receives the load from the hoist comprises in both embodiments accumulator forks that are insertable into the load path. The forks receive the load from the lift bed to support the load, thereby releasing the bed to retract to the hoist base and receive a second load. The forks retract from the path as the last tier is fed from them. The second load can then be hoisted into engagement with the tier-discharging means to maintain continuous feeding of the studs.

The foregoing and other objects, features, and advantages of the invention will become more apparent from the following detailed description of two preferred embodiments which proceed with reference to the accompanying drawings.

DETAILED DESCRIPTION

Preferred Embodiment

Figure 1:
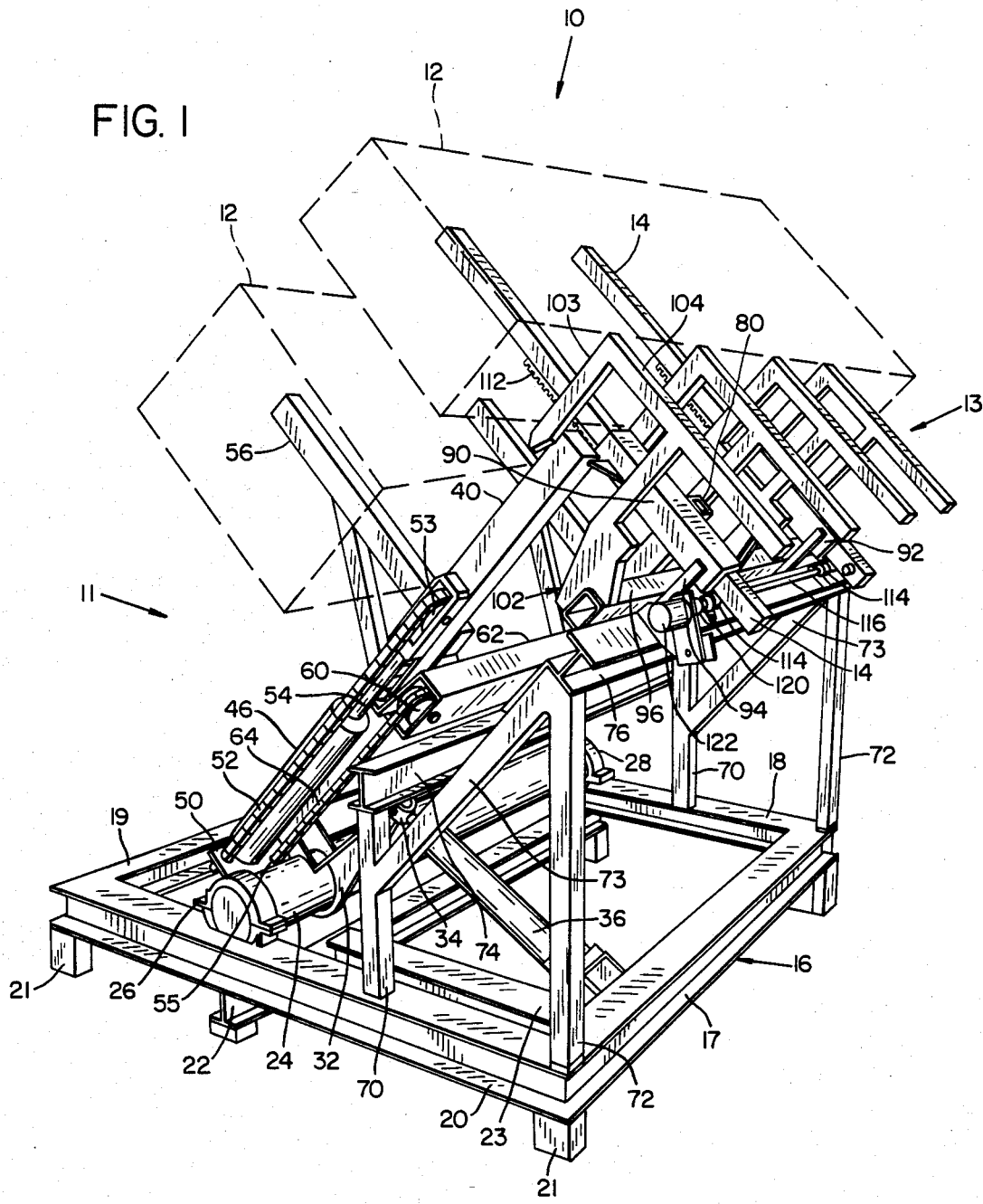
FIG. 1 is a perspective view of a first embodiment of a stud feeder apparatus according to the present invention.
Figure 2:
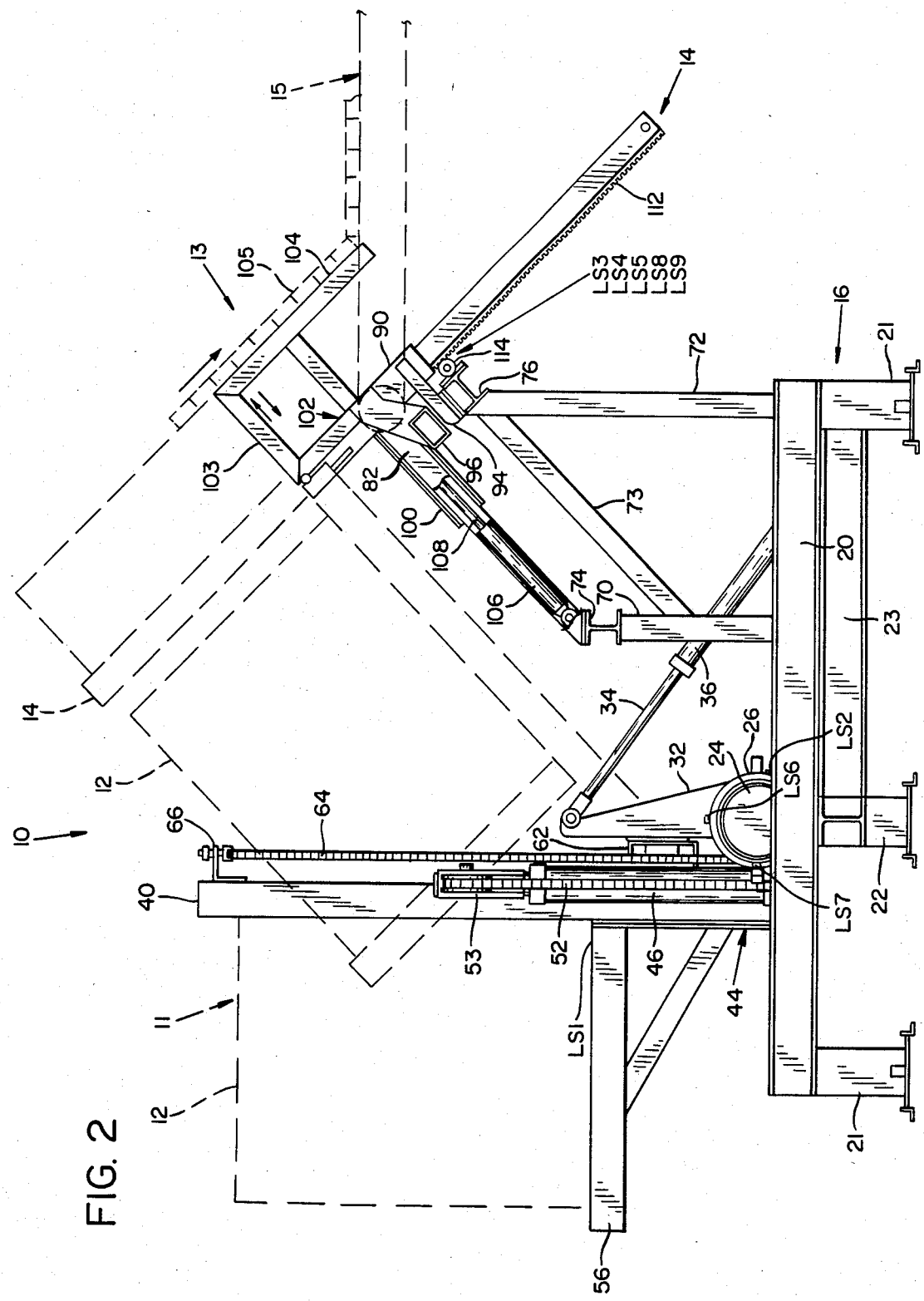
FIG. 2 is a side view of the apparatus of FIG. 1, with a portion of the apparatus broken away.

Referring to FIGS. 1 and 2, an apparatus 10 embodying the invention is shown. It includes means such as a pivotable hoist 11 for receiving a load 12 and hoisting it along an angular load path. An indexing accumulator member 13 positioned on the load path beyond the top of the hoist 11 forms tier-discharging means for effecting removal of the tiers of studs successively from the load. The accumulator 13 first moves upwardly or extends along the load path at a slower rate than the movement of the load so that the load tiers overtake the end of the accumulator 13 one by one permitting the tiers to slide from the top of the load. Means for accepting the load 12 from the hoist 11 are provided by accumulator forks 14, which extend into the load path to receive the load from the hoist once the bottom of the load is opposite the forks. This transfer of the load to the forks releases the hoist to return to its original position to receive another load. Meanwhile, tiers continue to slide from the preceding load onto the chain conveyor 15 as the accumulator 13 retracts along the load 12, now stationarily supported by forks 14.

Considering the structure of the apparatus in detail, it includes rectangular base frame 16 constructed of horizontal I-beams 17–20. The frame 16 itself rests on attached corner feet 21 and reinforcing cross beams 22, 23. Directly above beam 22 and running lengthwise with it is a rotatable shaft 24. The shaft is mounted in blocks 26, 28 that are set within opposing beams 18 and 20. The shaft 24 pivotally supports the attached hoist 11, which can move from a vertical position to a tilted position as shown in FIG. 2. Also attached to shaft 24 near the block 26 is a radial arm 32. The outer end of the arm is pivotally connected to a cylinder rod 34 of a tilt hydraulic cylinder 36, which provides the force for rotating the shaft and is anchored to the beam 17 at the rear of the frame 16. With the cylinder rod 34 fully displaced from the cylinder 36, the arm 32 is pushed to rotate the shaft so that the hoist is vertical. With the rod 34 fully retracted within the cylinder 36, the arm 32 is pulled to rotate the shaft to tilt the hoist 11 as shown in the dotted lines. The cylinder 36 is driven by a hydraulic pump, not shown, through the system shown in FIG. 4, which will be discussed below in the context of operation of the overall apparatus.

Figure 3:
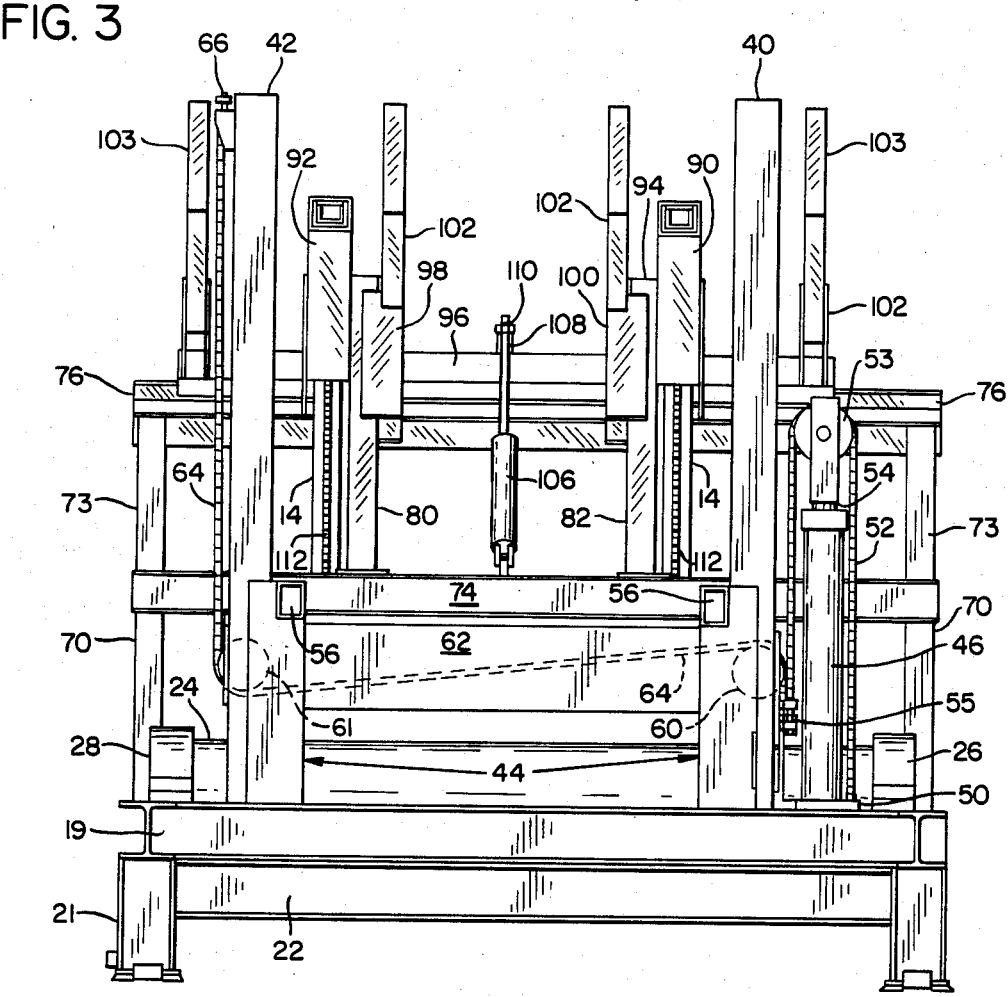
FIG. 3 is a front view of the apparatus of FIG. 1.

As shown in FIG. 3, the hoist 11 comprises a plurality of columns, in this case a pair of opposed columns 40, 42 which form a lower portion of the load path and are attached to the shaft 24 at the bases of the columns. The columns 40, 42 are movable through rotation of shaft 24 between a vertical position shown in solid lines in FIG. 2 and an angular position shown in dotted lines and in which other positions of the columns define a load-supporting plane for the load 12. Also included is a carriage 44 that is slidingly engaged with the columns 40, 42 and is raised and lowered along the columns by a hoist hydraulic cylinder 46 in what is known as a 2:1 configuration. As best seen in FIG. 3, the cylinder 46 is mounted to the outside base 50 of the column 40. A chain 52 tethered at the base 50 loops over a pulley 53 mounted on the end of a cylinder rod 54 in the cylinder and is tethered at its other end to an anchor 55 on the carriage 44. Displacing the rod 54 one unit of length causes the chain to raise the carriage two units of length. The rod cylinder is also driven by the hydraulic pump through the hydraulic system of FIG. 4.

The carriage 44 includes a braced lift bed 56 to carry the load and a means for leveling the bed as it is raised, such as a pulley and chain arrangement. Referring to FIGS. 1 and 3, the illustrated leveling arrangement comprises a pair of lateral spaced-apart pulleys 60, 61 mounted in a rear housing 62 of the carriage 44 and a tethered chain 64 threaded between the pulleys. The chain 64 is tethered to the base 50 and extends upward along the column 40 to loop over pulley 60 and across the width of the lift bed 56 to loop under pulley 61. From there it extends upward along column 42 to an anchor 66 at the top of the column 42. The leveling arrangement counteracts the binding torque on the carriage 44 otherwise caused by the lifting force of the cylinder 46 acting on the outer edge of the carriage rather than through its center of gravity. As the cylinder 46 raises the carriage upward, chain 64 presses pulley 60 downward and pulls pulley 61 upward to maintain the carriage levelly.

Mounted to the rear portion of the frame 16 along opposing beams 18, 20 and above beam 17 is the framework that supports the accumulator 13 and the forks 14. The framework has two forward uprights 70 and two rearward, taller uprights 72, with adjacent forward and rearward uprights braced together by angular braces 73. Lengthwise cross beams 74, 76 connect each pair of uprights 70, 72 to support a pair of guide bars 80, 82 angling upward from the lower beam 74 toward the upper beam 76, parallel to the load path formed by the tilted columns 40, 42. The guide bars 80, 82, which guide the accumulator 13, are each braced at their upper ends by rectangular hollow tubes 90, 92 that are attached to the cross beam 76 by brackets 94. The tubes 90, 92 support and guide the forks 14 as they are inserted into and retracted from the load path.

The accumulator 13 is best seen in FIGS. 1 and 3. It includes a cross brace 96 that supports a plurality of tier-discharging skids 102 spaced at lengthwise intervals along the brace. A pair of flanged runners 98, 100 are attached to the bottom of the brace to slidingly engage the guide bars 80, 82. Each skid 102 comprises a load-supporting element 103 extending along the load-supporting plane defined by the hoist columns and a ramp 104 extending downward from the end of the element 103 towards the conveyor 15. The load-supporting elements 103 support the load as it is hoisted beyond the top of columns 40, 42. The ramps 104 receive the topmost tier 105 of a load as the tier is exposed above the load-supporting elements 103 and guides the tier to the conveyor.

The accumulator 13 is urged along the bars 80, 82 by a hydraulic cylinder 106, seen in FIGS. 2 and 3. The cylinder is mounted at its base on the center of the cross beam 74, with the outer end of its rod 108 attached to a bracket 110 that is affixed to the center of cross brace 96. As the cylinder rod 108 is displaced from the cylinder 106, it urges the brace 96 upward to raise the accumulator 13 and extend the skids 102 outward, effectively lengthening the load path beyond the end of columns 40, 42. As the rod 108 retracts within the cylinder, the skids 102 are retracted along the path toward the framework 68, with the end of the load-supporting element 103 about even when completely retracted with the tops of the columns 40, 42.

The movement of the skids 102 along the load path permits the tiers of studs to slide from the skids ends. The load is hoisted faster than the skids extend, causing the load to overtake the ends of load-supporting elements 103 and the topmost layers of studs to slide successively down the ramps 104 to the conveyor 15. Once the load is transferred to and supported by the forks 14, the skids retract downwardly successively exposing tiers of studs so that they can slide over the end of the load-supporting elements 103 and onto the ramps 104. The cylinder 106 controlling this extension and retraction is driven by the same pump and hydraulic system as the tilt cylinder 36 and the hoist cylinder 46.

The forks 14 that receive the load from the carriage 44 are slidably disposed within tubes 90, 92 for extension into and out of the load path. They are actuated by a rack and pinion arrangement including a toothed rack 112 secured to the bottom side of each fork 14 and meshing with pinions 114 mounted on a rotable shaft 116. As best seen in FIG. 1, the shaft 116 is supported in blocks 120 atop cross beam 76 and is driven by a hydraulic motor 122. The shaft is rotated by the motor in one direction to extend the forks and in the opposite direction to retract them. The forks thus are operable to slide through the rectangular tubes 90, 92 into the load path to receive the load once it is hoisted, or indexed, past the forks and to retract through the tubes to allow engagement of the succeeding load with the skids 102. The motor 122 is driven by the conventional hydraulic pump through the hydraulic system of FIG. 4.

Operation

The operation of the apparatus 10 requires the coordinated movement of the hoist 11, the indexing accumulator member 13, and the accumulator forks 14. These operative elements of the apparatus are linked by control means that include the hydraulic and electrical systems shown in FIGS. 4 and 5, respectively.

Figure 4:
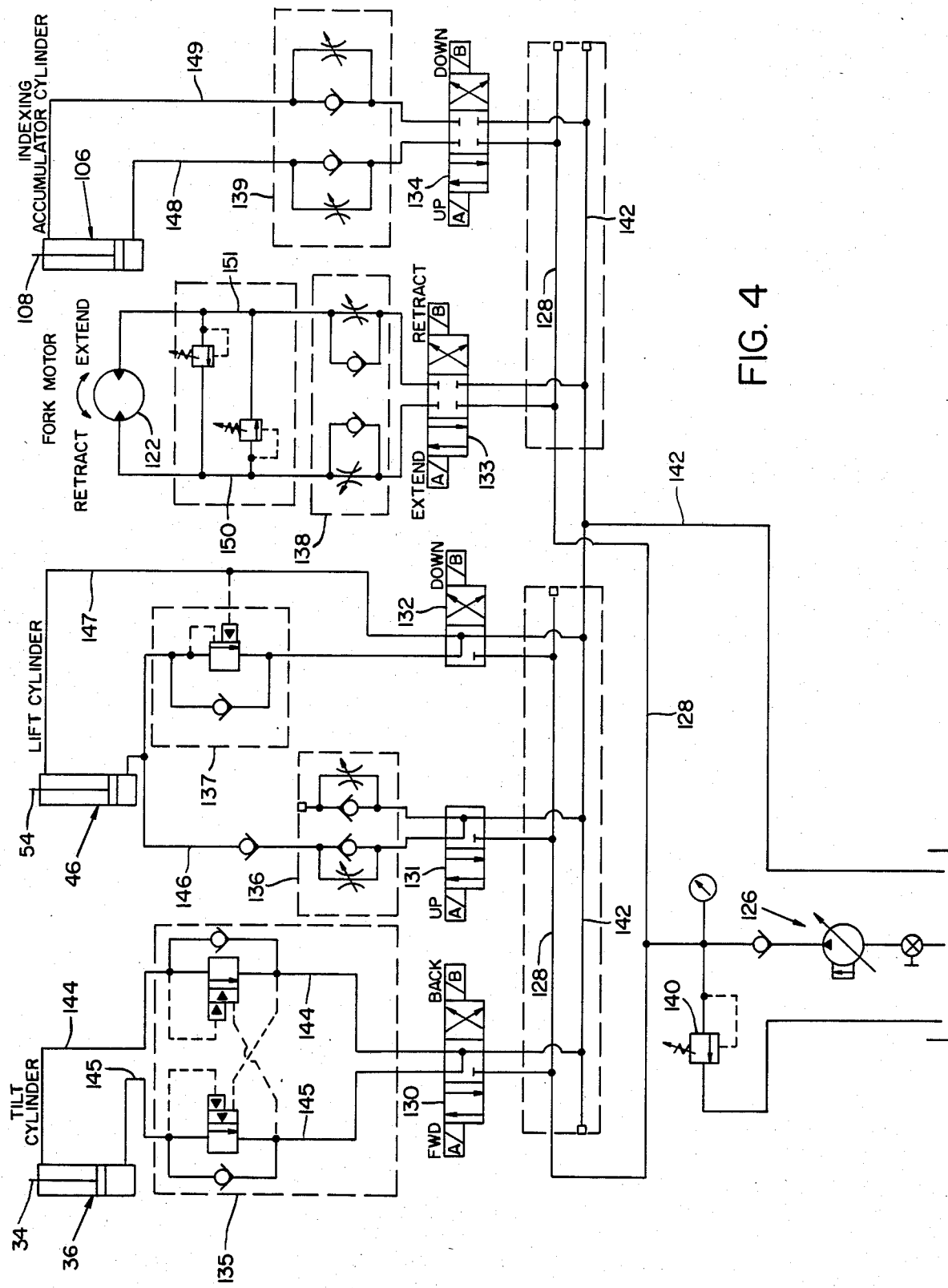
FIG. 4 is a schematic circuit diagram illustrating the hydraulic control circuit for the apparatus of FIG. 1.

Referring to FIG. 4, the hydraulic system of the apparatus comprises a pump 126 which pumps hydraulic fluid through an input line 128 to valves 130-134. Each valve acts through a corresponding regulator 135-139 to control the operation of the cylinders 36, 46, 106 and the fork motor 122. The system also includes a relief valve 140 for recirculating the fluid to pump 126 when all valves are closed and a system return line 142 for returning the fluid to the pump when fluid is pumped through valves 130-134.

Figure 5:
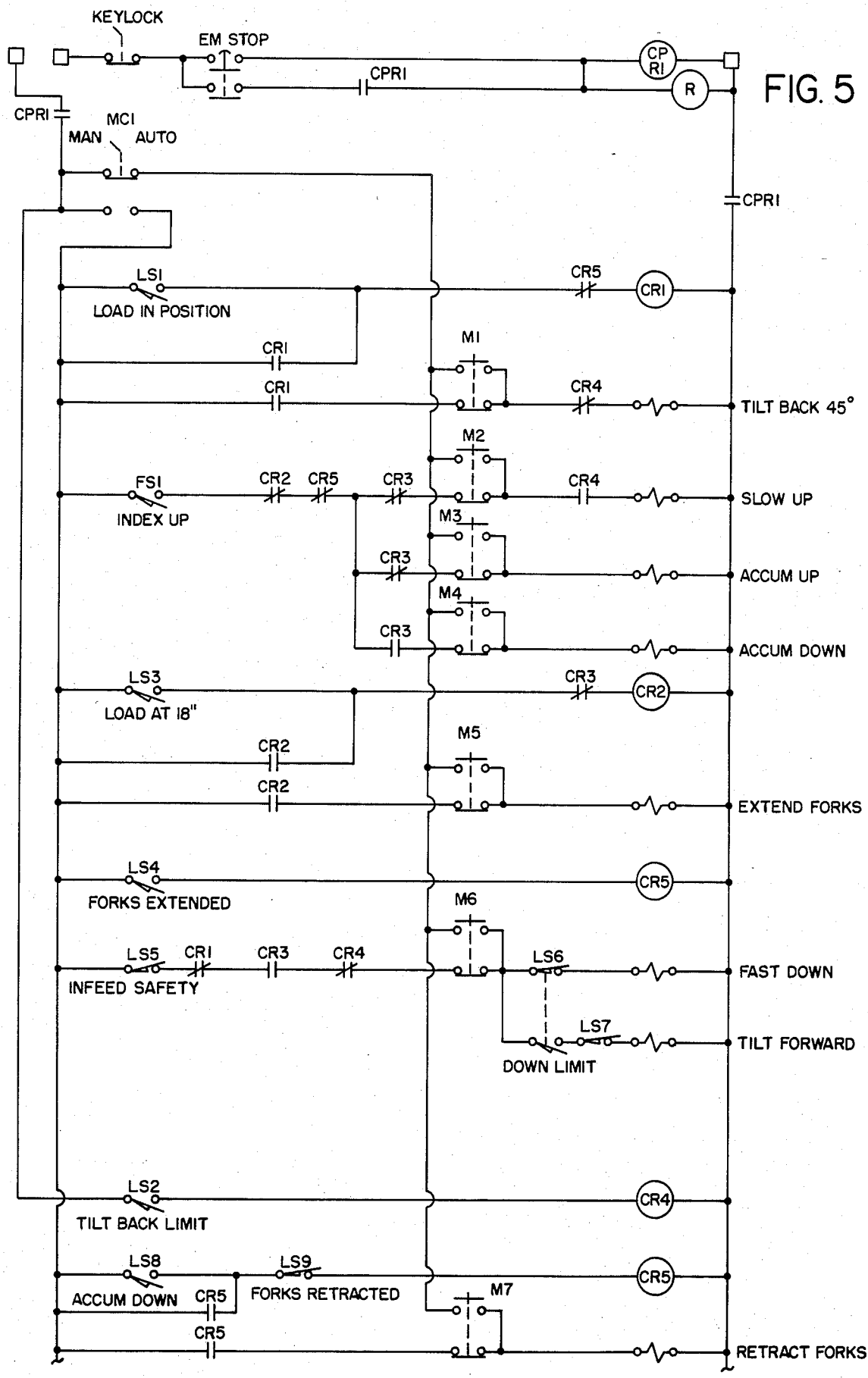
FIG. 5 is a schematic circuit diagram illustrating the electrical control circuit for the apparatus of FIG. 1.

Each of the valves 130-134 is controlled by the electrical system, which comprises the limit switches LS1-LS9 and control relays CR1-CR9, as shown in FIG. 5. The relays are shown for illustration only. They may be replaced by a conventional programmable controller for more efficient operation. Relays that are normally closed are shown with a slash through the relay symbol while those that are normally open have no slash. Actuating a relay that is normally closed will open it and actuating a relay that is normally open will close it. The switches, whose approximate locations on the apparatus are shown in FIG. 2, are actuated by physical contact to energize the relays, which open and close the valves and thus operate cylinders 36, 46, and 106 and the motor 122 in coordinated movement. The function of each switch is described in FIG. 5.

Operation of the apparatus is best understood by describing its operation cycle. Referring again to FIG. 2, assume the apparatus is operative and that a load 12 has just been placed on lift bed 56 with the columns 40, 42 in their vertical position. Control relay CPR1 is energized to provide power to the circuit and to light a red power-indicating light. The placing of the load closes switch LS1, causing it to actuate control relay CR1 to tilt cylinder 36 by opening valve 130 to position B. Hydraulic fluid then flows through the line 144 of regulator 135 to force the cylinder rod 34 to retract as the fluid below the cylinder head is driven out through the line 145 to return line 142. As it tilts, the hoist 11 closes switch LS2 to actuate control relay CR4 to stop the tilt by closing valve 130. The relay CR4 also operatively connects foot switch FS1 to valve 131 for operating hoist cylinder 46, as shown in the middle portion of FIG. 5. FS1 is manually operated so that the operator may index the load 12 slowly upward by command. FS1 is also operatively connected to valve 134, which controls the extension of the accumulator 13. Both lift bed 56 and accumulator 13 move together then as the switch FS1 is operated, with bed 56 moving at twice the rate of the accumulator 13 so that the load 12 overtakes the end of the load-supporting elements 103 of skids 102 and studs slide down ramps 104 onto conveyor 15. FS1 accomplishes this by opening valve 131 to position A so that hydraulic fluid flows in through line 146 of regulator 136 and out through line 147 to extend rod 48 and by opening valve 134 to position A so that fluid flows in through line 148 of regulator 139 and out through line 149 to extend rod 108.

At the operator's command, the accumulator 13 is indexed upward along the load path until it reaches full extension, at which point it stops. Lift bed 56 continues to move upward under command, causing studs to continue to slide from the skids. When the bed 56 comes abreast of the forks 14, the bed closes switch LS3 which actuates control relay CR2 to close valves 131 and 134, disabling the switch FS1 and stopping the extended movement of the bed 56 and accumulator 13. The relay CR2 also completes a circuit to extend the forks 14 by opening the valve 133 to position A, causing the hydraulic fluid to flow in through line 150 of the regulator 138 and out through line 151 to drive motor 122 in one direction.

Once the forks 14 are fully extended, they trip LS4, which stops their outward movement by actuating control relay CR3 to close valve 133. CR3 also completes a circuit to retract the lift bed 56 automatically to the bottom of the hoist by opening valve 132 to position B, causing hydraulic fluid to flow in through line 147 and out through line 146 to retract rod 48. As the bed retracts, it deposits the remaining portion of the load on the extended forks 14. In addition, CR3 reconnects switch FS1 to lower the accumulator 13 by opening valve 134 to position B so that fluid flows in through line 149 and out through line 148 to retract rod 108. Through the use of FS1, the operator can thus coordinate the accumulator's movement to meet the next load.

With the load supported now by the extended forks 14, the operator indexes the skids 102 of the accumulator downward to cause the studs to continue to slide from the skids' ends. In the meantime, the bed 56 retracts to the base of hoist 11 where the bed opens switch LS6 and closes switch LS7. This action closes valve 132 to stop the bed's downward movement and opens valve 130 to position A to tilt the hoist forward to the vertical. The fluid flows in through line 145 of valve 130 and out through line 144 to extend the rod 34. When vertical, the hoist opens switch LS7 to stop the hoist's forward movement by closing valve 130. Hoist 11 is now in position to receive a succeeding load and hoist it again toward the forks when LS1 is contacted.

When fully retracted, the accumulator 13 closes switch LS8 to actuate control relay CR5. CR5 completes a circuit to retract the forks by opening valve 133 to position B to cause the fluid to flow in through line 151 and out through line 150 to drive the motor 122 in the opposite direction. When the forks are fully retracted, they open switch LS9, which deactivates control relay CR5, closing valve 133 to stop the forks' downward movement and reconnecting foot switch FS1 to open valves 131 and valve 134 to hoist the lift bed 56 and the accumulator 13.

The opening of CR5 permits the hoist to begin another cycle. A second load is placed on the bed 56, closing switch LS1 and actuating control relay CR1 again. The hoist tilts to position the second load for hoisting onto the accumulator 13. The operator can then immediately index the bed 56 upward onto the retracted skids 102.

In addition to this automatic operation, the apparatus can be operated manually, with the hoist 11, the accumulator 13, and the forks 14 movable on command by manual switches M1 through M7, shown in FIG. 5. To operate it in the manual mode, master control switch MC1 is switched to the manual setting.

The apparatus also includes an in-feed safety switch LS5 which contacts the top of the load as it is tilted into position for hoisting. This switch prevents the load from being hoisted into the extended forks.

Second Embodiment

Figure 6:
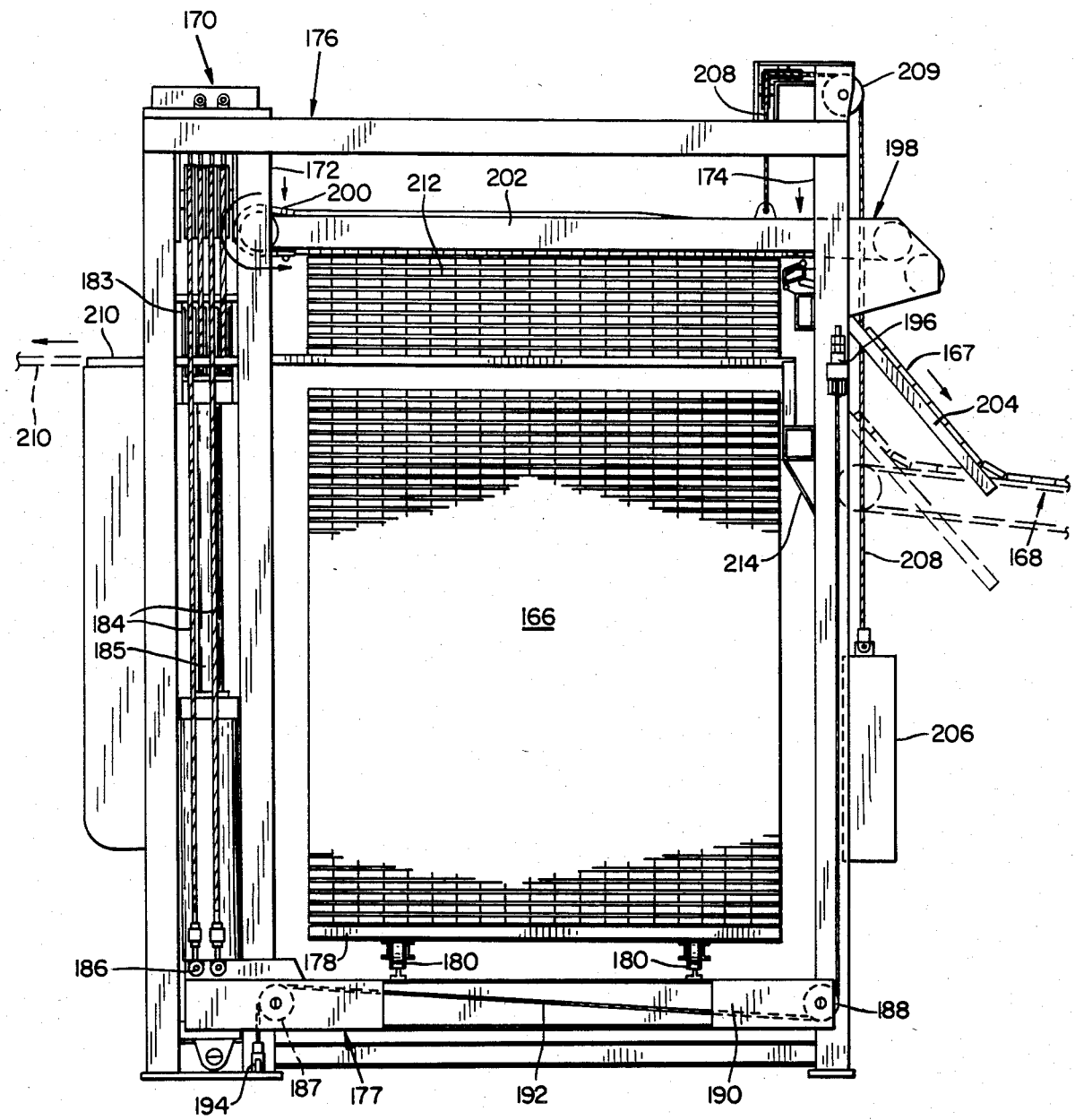
FIG. 6 is a front view of a second embodiment of the present invention.

A second embodiment of the apparatus is shown in FIG. 6. Rather than hoisting a load along an angular path and causing the tiers to slide successively from the end of the load, this embodiment hoists the load 166 vertically and then rakes tiers 167 from the top of the load onto a chain conveyor 168.

The apparatus is housed in a frame that comprises a hoist 170 with upright columns 172, 174 and a supporting horizontal framework 176 around the hoist. Shown at the base of the hoist 170 is a hoist bed or carriage 177 that slidingly engages columns 172, 174 for movement along a vertical load path formed by the columns. The load 166 may be supported on a kiln truck 178 equipped with rollers 180 so that it can easily be moved on and off the hoist bed 177.

The carriage 177 is raised and lowered by a hydraulic cylinder 182 adjacent column 174, powered by a hydraulic pump, not shown. The cylinder acts through a series of pulleys 183 and cables 184 that attach to the left side of the carriage, as shown in FIG. 6. The cables are tethered at one end to the top 185 of cylinder 182 and at the opposite end to an anchor 186 on the carriage 177. To raise the carriage, the cylinder retracts the rod 185, forcing the cables 184 to pull the carriage upward along columns 172, 174. To lower the carriage, the cylinder displaces its rod 185, releasing tension on the cables 184 to allow the carriage to drop by its own weight to the base of the hoist. The pulleys 183 and cables 184 multiply the movement of the rod 185 so that a relatively small movement of the rod raises or lowers the carriage a much greater distance.

As in the first embodiment, means for leveling the carriage are included. Pulleys 187, 188 are mounted vertically to the forward end housing 190 of the carriage 177 and a chain 192 is threaded between them. The chain is tethered at an anchor 194 adjacent the base of cylinder 182, loops over pulley 187 and extends across the face of the carriage to loop under pulley 188. From there it extends upward to an anchor 196 near the top of column 174. The pulleys and chain act to maintain the carriage level as it is raised with a load by the cylinder 182.

In the present embodiment the tier-discharging means comprises a raking mechanism 198 positioned to rest atop the load. The mechanism includes an endless lugged chain 200 that rotates around shafts mounted in a frame 202 with the lower flight adapted to engage the top tier of a load of studs. The chain is powered by an hydraulic motor, also not shown. The studs are raked by the chain 200 onto a ramp 204 which directs them to chain conveyor 168. The raking mechanism 198 slidingly engages columns 172, 174 and is supported by the load 166. Thus as a load 166 is raised, the raking mechanism likewise is raised. Lugs on the chain 200 engage the top tier of studs on the load 166 to rake it from the load as the raking mechanism 198 and load are raised. To facilitate the movement of the chain 200 on the load, it is counterbalanced by a counterweight 206 that hangs outside column 174. The weight is connected to the raking mechanism 198 by a chain 208 which loops over a pulley 209 mounted atop the framework 176 and down to the raking mechanism 198.

To relieve the load from the carriage 177 so that it may be lowered to receive a fresh load, accumulator forks 210 are insertable horizontally into and out of the vertical load path. They may be powered by another hydraulic motor operating through a rack and pinion arrangement (not shown) similar to that in the first embodiment.

Operation

The operation of this embodiment, as the first, involves coordinated movement of the forks 210, the carriage 177, and the raking mechanism 198.

Referring to the position of the load 166 as shown in FIG. 6, a preceding load 212 is shown stationarily supported by forks 210 with the load 166 mounted on the carriage 177. The chain 200 rotates as indicated by the arrow to rake tiers of studs from the top of the load onto the conveyor 168, causing the raking mechanism 198 to move downwardly along the load path toward the supporting forks 210. As the last tier is removed, the forks 210 retract from the load path and the carriage 177 hoists load 166 upward to engage the chain 200. The carriage 177 continues to move upward along the load path past the retracted forks, hoisting the load 166 and the raking mechanism 198 atop the load as tiers are raked from the load. In the process, the load 166 is raised at a faster rate than the raking mechanism 198.

Once the bottom of the load 166 is opposite the forks 210, the forks extend into the load path to receive the load from the bed or carriage 177. The raking mechanism 198 maintains its engagement with the top of the load 166 without further hoisting. The carriage 177 may then be lowered to receive a successive load as the chain 200 continues to rake tiers from the top of the load. In doing so, the raking mechanism 198 drops along the path as tiers are raked from the load, dropping toward the forks 210 until it rests on a stop 214 at its initial position after raking the last tier from the forks. The raking mechanism 198 is now positioned to move upward upon engaging a succeeding load.

As in the first embodiment, limit switches are positioned within the apparatus at appropriate locations to coordinate the movement of the carriage 177, the forks 210, and the raking mechanism 198. The cylinder 182 and the motors driving the chain 200 and forks 210 are driven by a hydraulic system similar to that of the first embodiment.

Having illustrated and described the principles of the invention in these preferred embodiments, it should be apparent to those skilled in the art that the invention can be modified in arrangement and detail without departing from such principles. I claim all modifications coming within the spirit and scope of the following claims.

I claim:

1. An apparatus for continuously feeding tiers from tiered loads, comprising:
   hoist means for receiving and then hoisting a tiered first load along a load path from a path base;
   tier-discharging means mounted to move with the first load along the load path at a rate slower than the hoisting of the load for engaging the first load as it is hoisted and effecting discharge of successive tiers from the load; and
   load-accepting means disposed along the load path and insertable into the load path for receiving the first load from the hoist means and for maintaining engagement of the load with the tier-discharging means as the hoist means lowers to receive a second load, the load-accepting means being thereafter retractable from the load path to allow engagement of the tier-discharging means with the second load.

2. The apparatus of claim 1 in which the hoist means includes a carriage for receiving a load at a base of the path and for moving the load along the path to engage the tier-discharging means, the load-accepting means being operatively connected to the hoist means to receive the load from the carriage.

3. The apparatus of claim 2 in which the carriage includes a pair of lateral, spaced-apart pulleys and a tethered chain threaded between the pulleys, the chain tethered at one end to the hoist means at its base adjacent power means for raising the carriage and tethered at the other end to a top of the hoist means across the carriage from the power means, the chain urging both pulleys levelly upward along the path as the carriage is raised.

4. The apparatus of claim 2 in which the load-accepting means includes fork means insertable into the path below the carriage to received the load therefrom, and retractable from the path once all the tiers are fed from its load.

5. The apparatus of claim 4 in which the fork means is stationary along the path's direction, insertable therein to support the load and retractable therefrom once the load has been fed from the forks.

6. An apparatus for continouously feeding tiers from tiered loads, comprising:
   hoist means for receiving and then hoisting a tiered first load along a load path from a path base;
   load-accepting means disposed along the load path and insertable into the load path for receiving the first load from the hoist means; and
   tier-discharging means adapted to move along the path with the load as the load is hoisted but at a slower rate than the load for continuously engaging the load to effect discharge of tiers therefrom and being adapted to move along the path toward the load once the load is received by the load-accepting means to continue to effect discharge of tiers from the load,
   the load accepting means maintaining engagement of the load with the tier-discharging means as the hoist means lowers to receive a second load, the load-accepting means being thereafter retractable from the load path to allow engagement of the tier-discharging means with the second load.

7. The apparatus of claim 6 in which the tier-discharging means includes skid means that extends along the load path, and means for moving the skid means upwardly and downwardly along the path in engagement with the load to permit successive tiers to slide from an end of the skid.

8. The apparatus of claim 6 in which the tier-discharging means includes a raking mechanism mounted for movement along the load path and adapted to rest upon the load, said raking mechanism including means to rake successive tiers from the load.

9. An apparatus for continuously feeding tiers from a tiered load, comprising:
   a frame;
   a hoist means on the frame for hoisting a tiered load;
   the hoist means including a load-supporting lift bed and columns means defining an inclined load path for the bed;
   power means for raising and lowering the bed along the column means;
   means pivotally mounting the column means on the frame for pivotal movement between a vertical, tiered-load receiving position and a tilted, load elevating position defining a load-supporting plane wherein the tiers of the load are at an angle greater than the angle of repose thereof and are supported at least partially on the column means and partially by the bed;
   a tier-discharging skid means mounted on the frame,
   the skid means comprising load-supporting elements extending along the load-supporting plane defined by the columns for receiving the topmost tier of the load from the columns as the load is hoisted and guiding such tier to a discharge means;
   fork means mounted on the frame for movement into and out of the load path;
   means for moving the fork means into and out of said path whereby the fork means may be moved beneath a tiered load to support it when the bottom of the load has been elevated by the bed to the elevation of the fork means and subsequently be retracted from the path; and
   means for moving the skid means and fork means relative to one another to move the tiers of a load supported by the fork means successively over the load-supporting elements, whereby the topmost tiers successively off the load and onto the skid elements.

10. The apparatus of claim 9 further comprising control means operatively connecting the hoist means to the fork means and skid means so that the hoist means, fork means, and skid means move in coordination continuously to feed tiers from the end of the skid means.

11. An apparatus for continuously raking tiers from a load, comprising:
    hoist means for receiving and hoisting a first tiered load forward along a load path;

a raking mechanism mounted in said load path and engageable with the top of said first load to rake successive tiers from said first load; and fork means disposed along the path and insertable therein for receiving said first load from the hoist means to support said first load as the raking mechanism continues to remove tiers from said first load and the hoist means retracts to receive a successive load, the fork means thereafter retractable from the path to allow engagement of the raking mechanism with the successive load, the raking mechanism moving forward along the load path with the hoisted load but at a slower rate so as to engage the load, and then moving backward along the path once the load is transferred to the fork means so that the raking mechanism continuously engages the load, the raking mechanism thereby returning to an initial position to engage a successive load once the tiers from the preceding load are fed from the forks.

12. An apparatus for continuously feeding tiers from successive tiered loads, comprising:

hoist means pivotally mounted for receiving a tiered first load and then pivoting to hoist the tiered first load upward along a load path from a path base;

tier-discharging means mounted for relative movement along the path toward the load as the load is hoisted and held stationary for engaging the first load and effecting discharge of successive tiers from the top of the load; and load-accepting means disposed along the load path and insertable into the path for receiving and holding the first load from the hoist means and for maintaining engagement of the load with the tier-discharging means as the hoist means lowers to receive a second load, the load-accepting means thereafter retractable from the path to allow engagement of the tier-discharging means with the second load.

* * * * *

UNITED STATES PATENT AND TRADEMARK OFFICE
CERTIFICATE OF CORRECTION

PATENT NO. :   4,640,655
DATED      :   February 3, 1987
INVENTOR(S):   Marvin A. Jacobsen It is certified that error appears in the above-identified patent and that said Letters Patent is hereby corrected as shown below:

Column 9, line 50, change "received" to --receive--.

Column 10, line 56, after "tiers" insert --slide--.

Signed and Sealed this

Twenty-ninth Day of September, 1987

Attest:

DONALD J. QUIGG

*Attesting Officer*      *Commissioner of Patents and Trademarks*